United States Patent [19]
Nishioka

[11] Patent Number: 6,089,919
[45] Date of Patent: Jul. 18, 2000

[54] IC CARD CONNECTOR

[75] Inventor: Toru Nishioka, Miyagi-ken, Japan

[73] Assignee: Alps Electric Col, Ltd., Tokyo, Japan

[21] Appl. No.: 09/305,832

[22] Filed: May 5, 1999

[30] Foreign Application Priority Data

May 18, 1998 [JP] Japan .................................. 10-134907

[51] Int. Cl.[7] .................................................. H01R 24/00
[52] U.S. Cl. ............................................................ 439/630
[58] Field of Search ............................. 439/630, 64, 377;
235/441, 380

[56] References Cited

U.S. PATENT DOCUMENTS 5,586,890 12/1996 Braun .......................................... 439/66
5,659,459 8/1997 Wakabayashi et al. .................. 361/753
5,775,929 7/1998 Hashiguchi .

*Primary Examiner*—Khiem Nguyen
*Assistant Examiner*—Brian S. Webb
*Attorney, Agent, or Firm*—Brinks Hofer Gilson & Lione

[57] ABSTRACT

In a conventional IC card connector, guide walls provided on side walls of a housing comprise surfaces parallel to each other, and an interval between the guide walls is somewhat greater than a maximum width of a standard of the IC card. If the IC card having the width less than the maximum value of the standard is used, the IC card is greatly slanted due to a large amount of play, and an operation member of a detection switch cannot be operated by the IC card. In an IC card connector of the present embodiment, if the width of the IC card is small, the IC card is supported at sides by vertical surfaces, thus the movement of the IC card in the widthwise direction is regulated. If the width of the IC card is large, the IC card is supported at the side by a slope, thus the movement of the IC card is regulated. Accordingly, the arrangement provides a highly-reliable IC card connector device which ensures operation of an operation member of a detection switch by the IC card and ensures connection between contacts provided on the IC card and terminals.

4 Claims, 9 Drawing Sheets

IC CARD CONNECTOR

BACKGROUND OF THE INVENTION

The present invention relates to an IC card connector preferably applicable to devices such as a personal computer and a digital camera.

An IC card includes an IC having arithmetic and storage functions incorporated therein, and an external device such as a personal computer or a digital camera, which performs information processing by using the IC card as a medium, has an IC card connector with a plurality of terminals corresponding to respective contacts of the bottom surface of the IC card.

The IC card connector is used when the IC card is inserted into an insertion slot of the connector. When the insertion of the IC card into the slot has been completed, the respective contacts of the IC card are in contact with the respective terminals. This state is maintained, and signal reception/transmission can be made.

FIGS. 13 to 20 show a conventional IC card connector. A housing 31 of synthetic resin is constructed by integrating an upper cover 31a and a lower cover 31b.

The housing 31 has a rectangular shaped insertion slot 31f comprising a pair of side walls 31c and 31d and a rear wall 31e, through which an IC card 40 is inserted, in the juncture of the upper and lower covers 31a and 31b.

In the insertion slot 31f, the side walls 31c and 31d have guide walls 31g and 31h to guide both sides 40a and 40b of the IC card 40. The guide walls 31g and 31h, parallel to each other, have vertical surfaces in an orthogonal direction to an inner wall surface 31j of the rear wall 31e.

Especially as shown in FIGS. 13 and 14, a plurality of terminals 32 of metal plates are arrayed in two lines and attached to a center of a lower surface of the lower cover 31b of the housing 31. Contact members 32a of the terminals 32 project through holes of the lower cover 31b into the insertion slot 31f.

When the IC card 40 is inserted into the insertion slot 31f, while guided by the guide walls 31g and 31h, a plurality of contacts 41 provided on the IC card 40 come into contact with the contact members 32a of the terminals 32.

A detection switch 33 is used for detecting whether or not the IC card 40 is inserted in the insertion slot 31f. As especially shown in FIGS. 15 to 18, the detection switch 33 has a contact member 34 of a metal spring plate having an operation member 34a, and a contact member 35 of a metal spring plate contactable/separable with respect to the contact member 34.

The detection switch 33 is attached to a hollow on the rear wall 31e such that the operation member 34a is located in a position out of the center of the housing 31 in its widthwise direction, i.e., in a position around the side wall 31c, and the operation member 34a projects in the insertion slot 31f.

As shown in FIGS. 15 and 16, when the IC card 40 is not inserted, the detection switch 33 is in an OFF state where the contact members 34 and 35 are turned OFF. As shown in FIGS. 17 and 18, when the IC card 40 is inserted, the front end of the IC card 40 operates the operation member 34a, and the contact members 34 and 35 are turned ON. Then it is detected that the IC card 40 has been inserted.

The IC card 40 has a width defined by a standard (ISO7816).

In the standard, as a width H of the IC card 40, a nominal width is 53.98 mm; a minimum width is 53.92 mm; and a maximum width is 54.03 mm. Generally, many IC cards have the nominal width, however, various widths from the minimum to the maximum width are actually used.

In consideration of the above-described width H of the IC card 40, a width H1 of the insertion slot 31f of the housing 31 (the interval between the guide walls 31g and 31h) is somewhat greater than the maximum width of the standard such that IC cards of all the widths H can be inserted into the slot.

Accordingly, if the width H of the IC card 40 is less than the maximum width of the standard, a considerable amount of play occurs.

That is, if the IC card 40 having the width H less than the maximum width of the standard is inserted, the IC card 40 is greatly slanted by the large amount of play, as shown in FIGS. 19 and 20.

In FIG. 19, a front end 40d of the IC card 40 positioned on the side wall 31d side abuts against the inner wall surface 31j of the rear wall 31e, while a front end 40c of the IC card 40 positioned on the wide wall 31c side is greatly away from the inner wall surface 31j of the rear wall 31e, accordingly, the operation member 34a of the detection switch 33 cannot be operated by the IC card 40, further, there may be contact failure between the terminals 32 and the contacts 41 of the IC card 40.

Further, in FIG. 20, the front end 40c of the IC card 40 positioned on the side wall 31c side abuts against the inner wall surface 31j of the rear wall 31e, to operate the operation member 34a, while the front end 40d of the IC card 40 positioned on the side wall 31d side is greatly away from the innerwall surface 31j of the rearwall 31e, accordingly, contact failure may occur between the terminals 32 and the contacts 41 of the IC card 40.

Further, if vibration, shock or the like is applied to the connector when the IC card 40 is inserted, a backlash may occur within the insertion slot 31f due to the large amount of play, or the reliability may be lowered.

The conventional IC card connector is formed with the guide walls 31g and 31h, provided on the side walls 31c and 31d of the housing 31, have surfaces parallel to each other, and the interval Hi between the guide walls 31g and 31h is somewhat greater than the maximum width of the standard of the IC card 40. Accordingly, if the IC card 40 with the width H less than the minimum width of the standard is inserted, the IC card 40 is slanted greatly due to a large amount of play, thus the operation member 34a of the detection switch 33 cannot be operated by the IC card 40.

Further, as the IC card 40 is greatly slanted, contact failure may occur between the terminals 32 and the contacts 41 of the IC card 40.

Further, if vibration, shock or the like is applied to the connector when the IC card 40 is inserted, a backlash may occur within the insertion slot 31f due to the large amount of play, or the reliability may be lowered.

SUMMARY OF THE INVENTION

As a first means of solving the above problems, the present invention has object to provide an IC card connector comprising: a rear wall having an inner wall surface abuttable against a front end of an IC card; first and second side walls, provided with an interval therebetween, extending in an orthogonal direction from the rear wall, having guide walls to support sides of the IC card; a housing having an insertion slot for inserting the IC card, formed with the rear wall and the first and second side walls; a detection switch provided at a rear portion of the housing, having an operation member operated by the IC card; and terminals attached to the housing and contactable with contacts provided on the IC card, wherein the operation member of the detection switch is provided around the first side wall, and the guide wall of the first side wall has a first vertical surface provided in an orthogonal direction to the inner wall surface of the rear wall in a deep part of the insertion slot, and a first slope connected to the first vertical surface, gradually increasing space of the insertion slot toward a front part of the insertion slot, and wherein the guide wall of the second side wall has a second vertical surface provided in the orthogonal direction to the inner wall surface of the rear wall at the front portion of the insertion slot, and a dent to increase the space of the insertion slot in the deep part of the insertion slot.

Further, as a second means of solving the above problems, provided is the IC card connector having the above construction, wherein the dent provided on the guide wall of the second side wall comprises a second slope connected to the second vertical surface, gradually increasing the space of the insertion slot toward the deep part of the insertion slot.

Further, as a third means of solving the above problems, provided is the IC card connector having the above construction, wherein the interval between the first vertical surface and the second vertical surface is equal to a nominal width of a standard of the IC card.

Further, as a fourth means of solving the above problems, provided is the IC card connector having the above construction, wherein the interval between the first vertical surface and the second vertical surface is equal to a nominal width of a standard of the IC card, and wherein the interval between the first slope and the second slope is slightly greater than a maximum width of the standard of the IC card.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Next, a first embodiment of the IC card connector of the present invention will be described with reference to FIGS. 1 to 10.

As described above, the IC card includes an IC having arithmetic and storage functions incorporated therein, and an external device such as a personal computer or a digital camera, which performs information processing by using the IC card as a medium, has an IC card connector with a plurality of terminals corresponding to respective contacts of the bottom surface of the IC card.

The IC card connector is used when the IC card is inserted into the insertion slot of the connector. When the insertion of the IC card into the insertion slot has been completed, the respective contacts of the IC card are in contact with the respective terminals of the connector. This status is maintained, and signal reception/transmission can be made.

Figure 1:
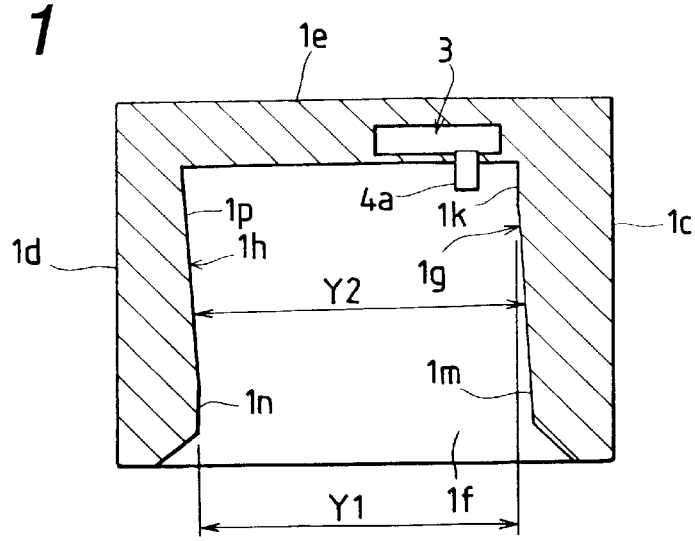
FIG. 1 is a significant-part sectional plan view showing a schematic structure of a housing of an IC card connector according to a first embodiment of the present invention.
Figure 2:
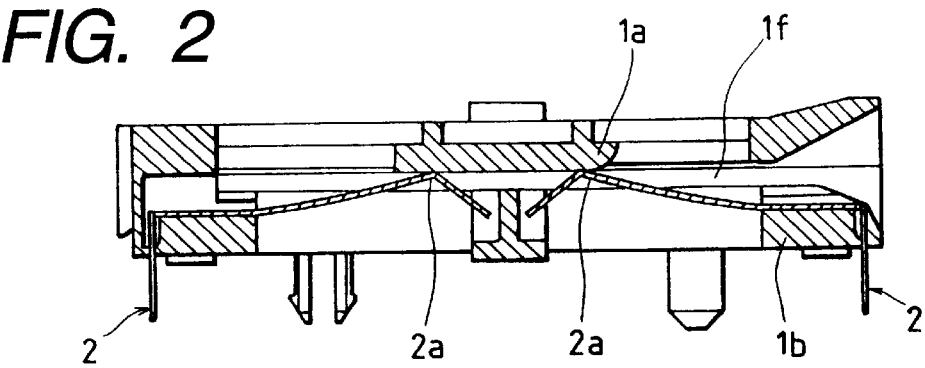
FIG. 2 is a significant-part cross sectional view of the IC card connector according to the first embodiment.
Figure 3:
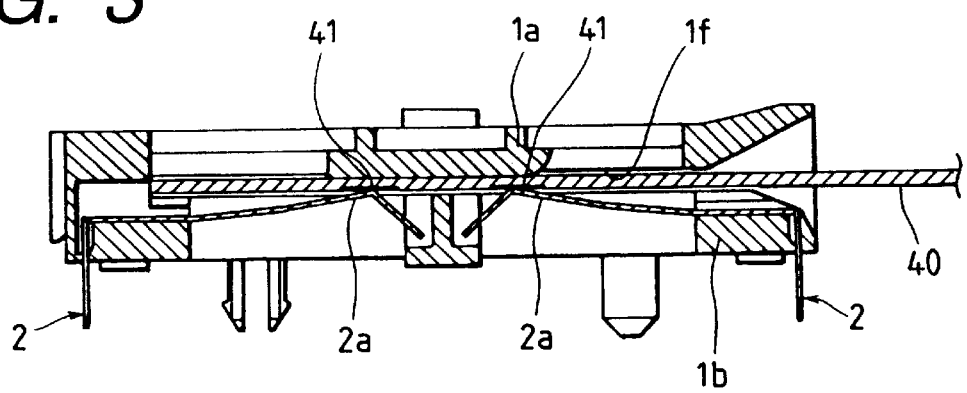
FIG. 3 is a significant-part cross sectional view of the IC card connector according to the first embodiment, in which an IC card is inserted.

Next, the IC card connector of the present invention using the above IC card will be described with reference to FIGS. 1 to 10. A housing 1 of synthetic resin is constructed by integrating an upper cover 1a with a lower cover 1b, as shown in FIGS. 2 and 3.

The housing 1 has a rectangular shaped insertion slot if comprising a pair of side walls 1c and 1d and a rear wall 1e, through which the IC card 40 is inserted, in the juncture of the upper and lower covers 1a and 1b.

Further, in the insertion slot 1f, the side walls 1c and 1d have guide walls 1g and 1h to guide both sides 40a and 40b of the IC card 40. The one guide wall 1g has a vertical surface 1k provided in an orthogonal direction to an inner wall surface 1j of the rear wall 1e in a deep part of the insertion slot 1f, and a slope 1m connected to the vertical surface 1k, gradually increasing space of the insertion slot 1f toward a front end of the insertion slot 1f. The other guide wall 1h has a vertical surface 1n provided in an orthogonal direction to the inner wall surface 1j of the rear wall 1e in a front part of the insertion slot 1f, and a dent 1p having a slope connected to the vertical surface 1n, increasing the space of the insertion slot 1f toward the deep part of the insertion slot 1f.

The vertical surface 1k and the vertical surface 1n are provided in parallel to each other, and the slopes of the slope 1m and the dent 1p are parallel to each other.

Further, as especially shown in FIGS. 2, 3, and 8 to 10, a plurality of terminals 2 of metal plates are arrayed in two lines and attached to the center of a lower surface of the lower cover 1b of the housing 1. Contact members 2a of the terminals 2 are projected through holes of the lower cover 1b into the insertion slot 1f.

When the IC card 40 is inserted into the insertion slot 1f while guided by the guide walls 1g and 1h, a plurality of contacts 41 provided on the IC card 40 come into contact with the contact members 2a of the respective terminals 2.

Further, a detection switch 3 is used for detecting whether or not the IC card 40 is inserted in the insertion slot 1f. As especially shown in FIGS. 4 to 7, the detection switch 3 has a contact member 4 of a metal spring plate having an operation member 4a and a contact member 5 of a metal spring plate contactable/separable with respect to the contact member 4.

The detection switch 3 is attached to a dent on the rear wall 1e in a status where the operation member 4a is located in a position out of the center of the housing 1 in its widthwise direction, i.e., a position around the side wall 1c, and the operation member 4a projects in the insertion slot 1f.

Figure 4:
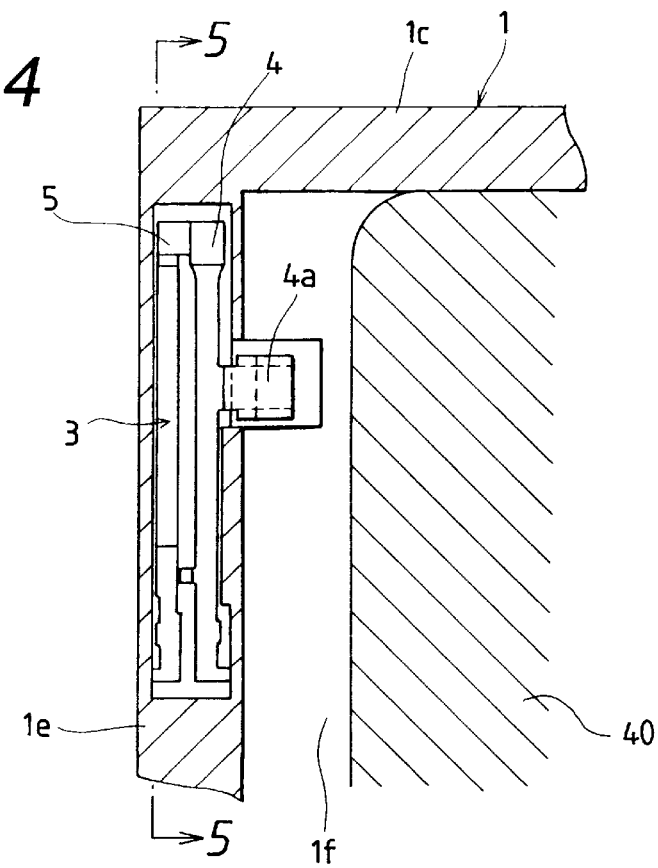
FIG. 4 is an expanded significant-part sectional plan view of the IC card connector according to the first embodiment, in which a detection switch is attached.
Figure 5:
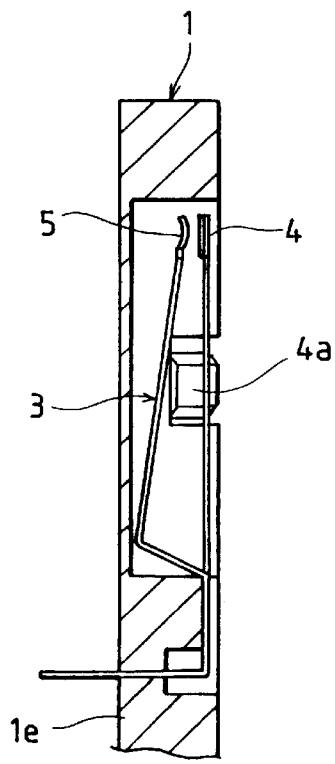
FIG. 5 is a cross sectional view cut along a line 5—5 in FIG. 4.
Figure 6:
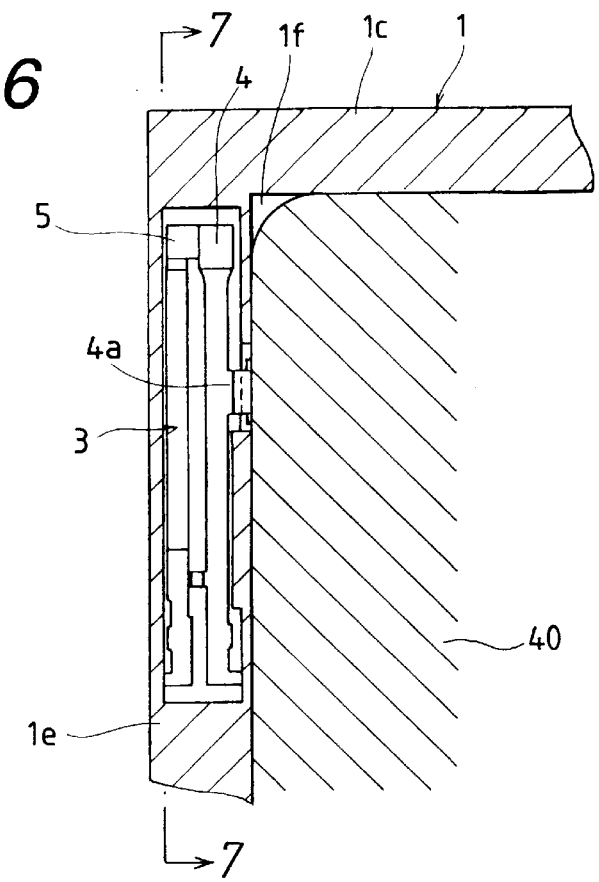
FIG. 6 is an expanded significant-part sectional plan view of the IC card connector according to the first embodiment, in which the IC card is inserted.
Figure 7:
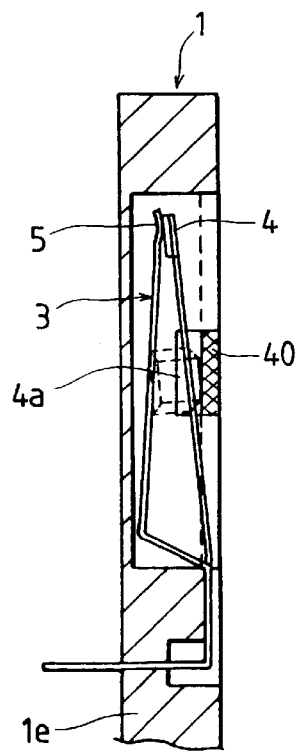
FIG. 7 is a cross sectional view cut along a line 7—7 in FIG. 6.

As shown in FIGS. 4 and 5, when the IC card 40 is not inserted, the detection switch 3 is in an OFF status where the contact members 4 and 5 are turned OFF. As shown in FIGS. 6 and 7, when the IC card 40 is inserted, the operation member 4a is operated by the front end of the IC card 40, then the contact members 4 and 5 are turned ON, and it is detected that the IC card 40 is inserted.

Further, the IC card 40 has a width defined by a standard (ISO7816).

In the standard, as a width H of the IC card 40, a nominal width is 53.98 mm; the minimum width is 53.92 mm; and the maximum width is 54.03 mm. Generally, many IC cards 40 have the nominal width, however, IC cards of widths from the minimum width to the maximum width are actually used.

Accordingly, the insertion slot 1f of the housing 1 must be formed so as to be suitable for all the widths H in consideration of the width H of the IC card 40.

In the present invention, an interval Y1 between the vertical surface 1k provided on the side wall 1c and the vertical surface 1n provided on the side wall 1d is equal to the nominal width of the standard of the IC card 40. Further, an interval Y2 between the slope 1m provided on the side wall 1c and the slope of the dent 1p provided on the side wall 1d is slightly greater than the maximum width of the standard of the IC card 40.

Figure 8:
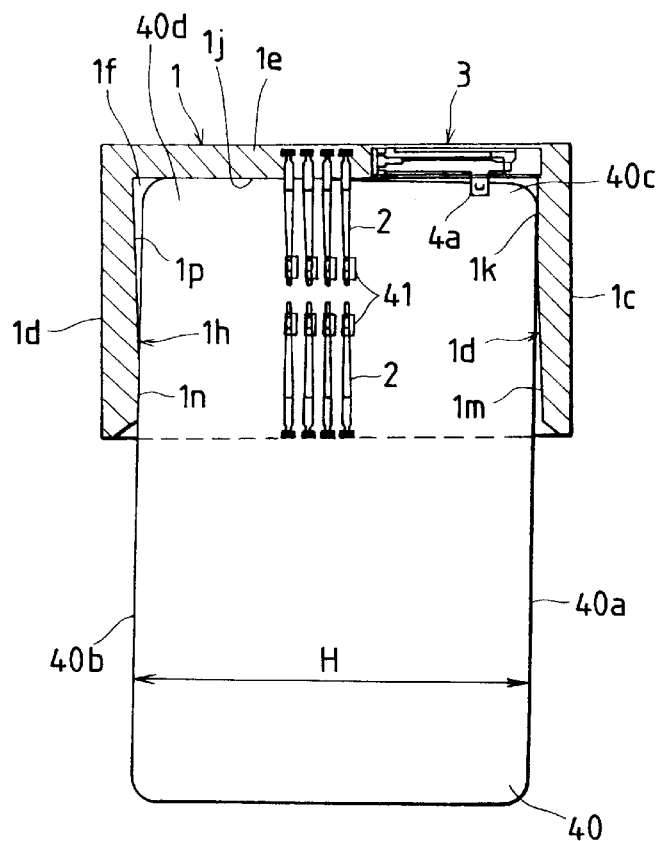
FIG. 8 is a plan view showing the IC card connector according to the first embodiment, in which the IC card is inserted.

If the IC card 40 having the width H equal to or somewhat greater than the minimum width of the standard is inserted into the insertion slot 1f, the front end 40d of the IC card 40 abuts against the inner wall surface 1j of the rear wall 1e, and the IC card 40 is supported at a deep part of the side 40a by the vertical surface 1k and at a front part of the side 40b by the vertical surface 1n, as shown in FIG. 8.

This arrangement regulates movement of the IC card 40 in the widthwise direction, and reduces separation of the front end 40c of the IC card 40 from the inner wall surface 1j, thus ensuring the operation of the operation member 4a of the detection switch 3 by the IC card 40.

Further, as the movement of the IC card 40 in the widthwise direction is regulated, the contacts 41 provided on the IC card 40 are reliably connected with the terminals 2.

Figure 9:
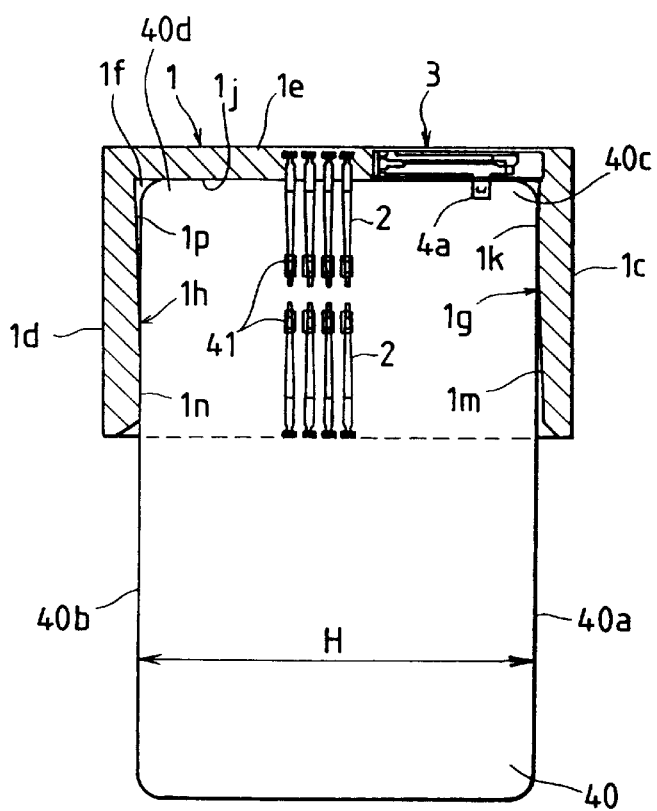
FIG. 9 is a plan view showing the IC card connector according to the first embodiment, in which the IC card is inserted.

Further, if the IC card 40 having the width H equal to the nominal width of the standard is inserted into the insertion slot 1f, the front ends 40c and 40d abut against the inner wall surface 1j of the rear wall 1e, and the IC card 40 is supported at the deep part of the side 40a by the vertical surface 1k and at the front part of the side 40b by the vertical surface 1n, as shown in FIG. 9.

This arrangement regulates the movement of the IC card 40 in the widthwise direction, and prevents front ends 40c and 40d of the IC card 40 from moving away from the inner wall surface 1j, further ensures operation of the operation member 4a of the detection switch 3 by the IC card 40.

Further, as the movement of the IC card 40 in the widthwise direction is regulated, the contacts 41 provided on the IC card 40 are reliably connected with the terminals 2.

Figure 10:
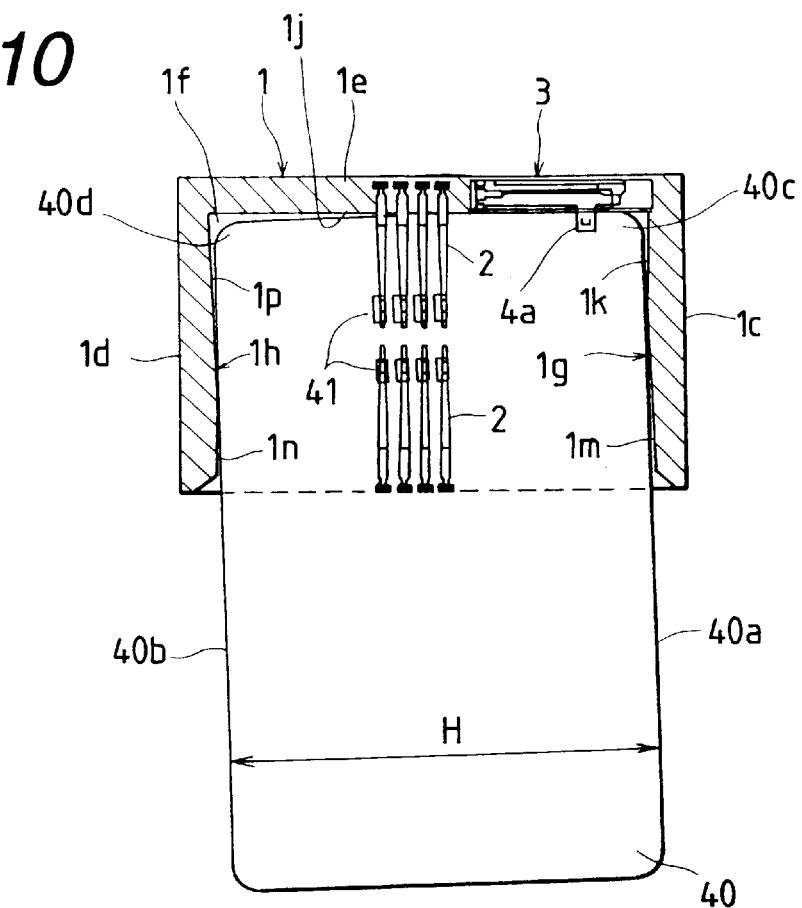
FIG. 10 is a plan view showing the IC card connector according to the first embodiment, in which the IC card is inserted.

If the IC card 40 having the width H equal to or somewhat less than the maximum width of the standard is inserted into the insertion slot 1f, the front end 40c of the IC card 40 abuts against the inner wall surface 1j of the rear wall 1e, and the IC card 40 is supported at the front part of the side 40a by the slope 1m and at the deep part of the side 40b by the slope of the dent 1p, as shown in FIG. 10.

This arrangement ensures operation of the operation member 4a of the detection switch 3 by the IC card 40, and regulates the movement of the IC card 40 in the widthwise direction, further, reduces separation of the front end 40d of the IC card 40 from the inner wall surface 1j, thus ensuring contact between the contacts 41 of the IC card 40 and the terminals 2.

Figure 11:
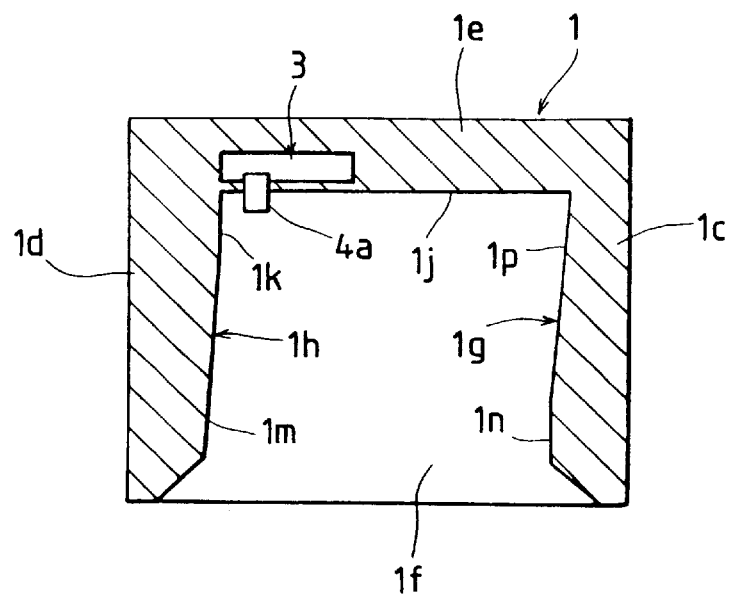
FIG. 11 is a significant-part sectional plan view showing the schematic structure of the housing of the IC card connector according to a second embodiment of the present invention.

Further, FIG. 11 shows a second embodiment of the IC card connector of the present invention. The detection switch 3 is provided in a status where the operation member 4a is positioned around the side wall 1d. The guide wall 1h has a vertical surface 1k provided in the orthogonal direction to the inner wall surface 1j of the rear wall 1e in the deep part of the insertion slot 1f, and a slope 1m connected to the vertical surface 1k, gradually increasing space of the insertion slot 1f toward the front part of the insertion slot 1f. The guide wall 1g has a vertical surface 1n provided in the orthogonal direction to the inner wall surface 1j of the rear wall 1e in the front part of the insertion slot 1f, and a dent 1p comprising a slope gradually increasing the space of the insertion slot 1f towards the deep part of the insertion slot 1f.

That is, as the detection switch 3 is positioned on the side wall 1d, the relation between the vertical surface and slope is opposite to that in the first embodiment.

Figure 12:
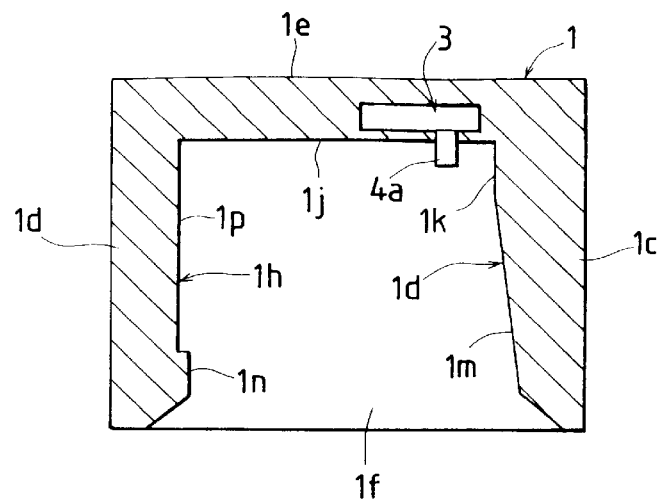
FIG. 12 is a significant-part sectional plan view of the housing of the IC card connector according to a third embodiment of the present invention.
Figure 13:
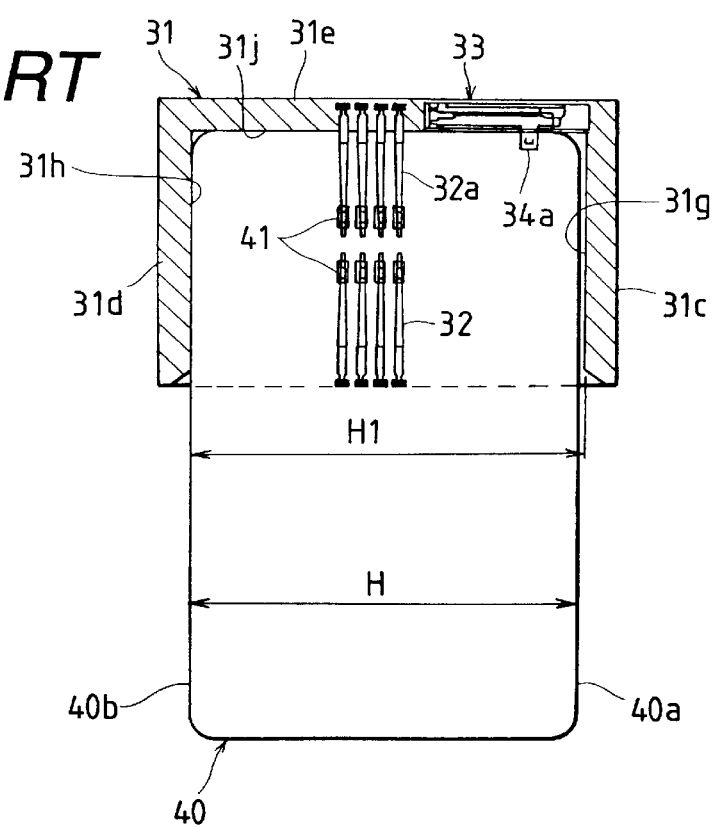
FIG. 13 is a significant-part sectional plan view of the conventional IC card connector.
Figure 14:
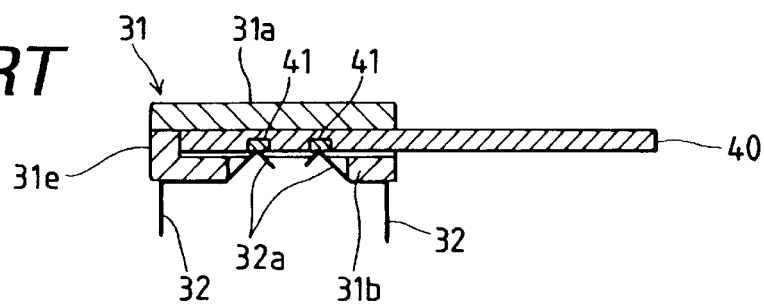
FIG. 14 is a significant-part cross sectional view of the conventional IC card connector.
Figure 15:
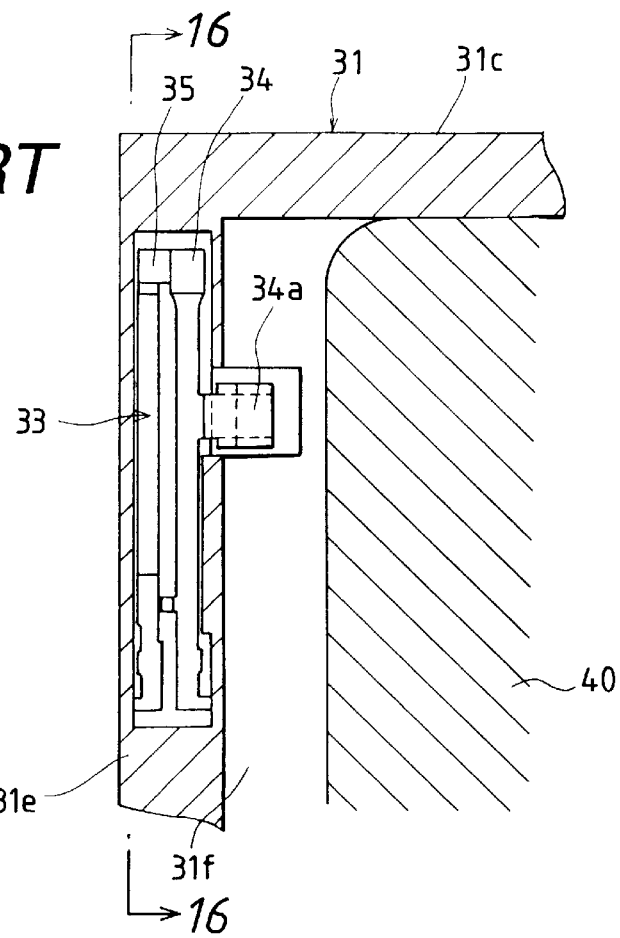
FIG. 15 is an expanded significant-part sectional plan view of the conventional IC card connector, in which the detection switch is attached.
Figure 16:
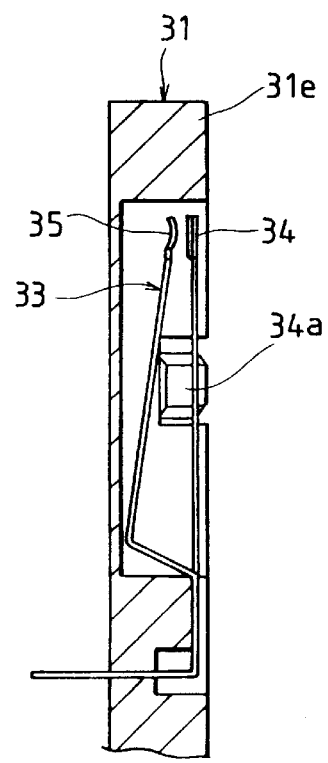
FIG. 16 is a cross sectional view cut along a line 16—16 in FIG. 15.
Figure 17:
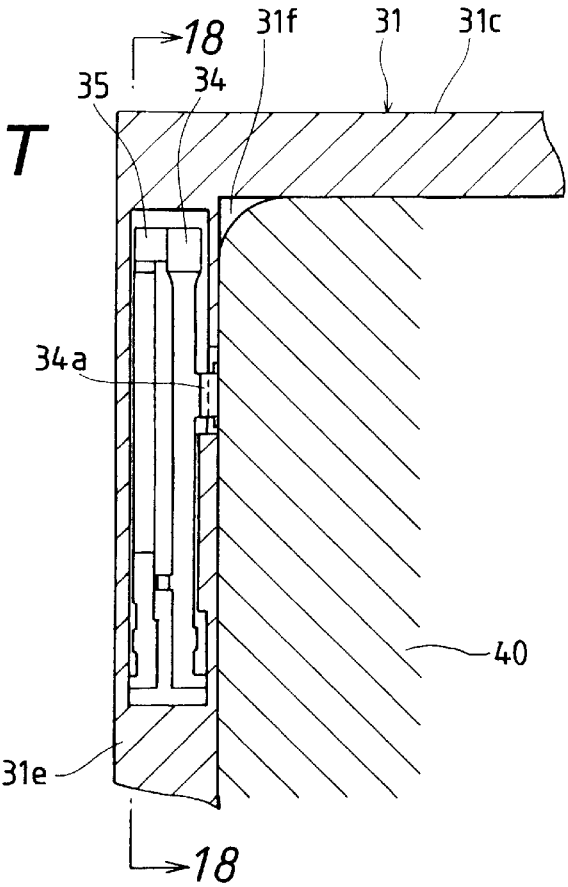
FIG. 17 is an expanded significant-part sectional plan view of the conventional IC card connector, in which the IC card is inserted.
Figure 18:
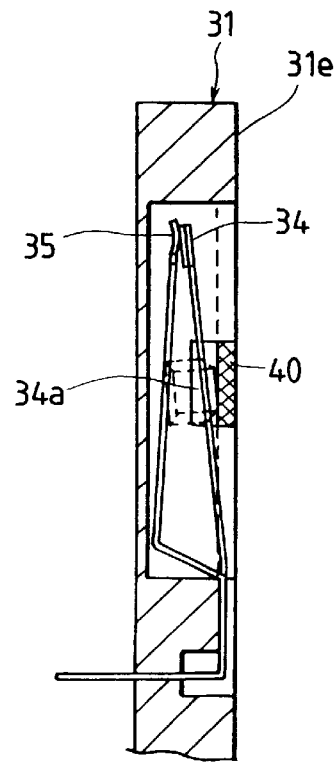
FIG. 18 is a cross sectional view cut along a line 18—18 in FIG. 17.
Figure 19:
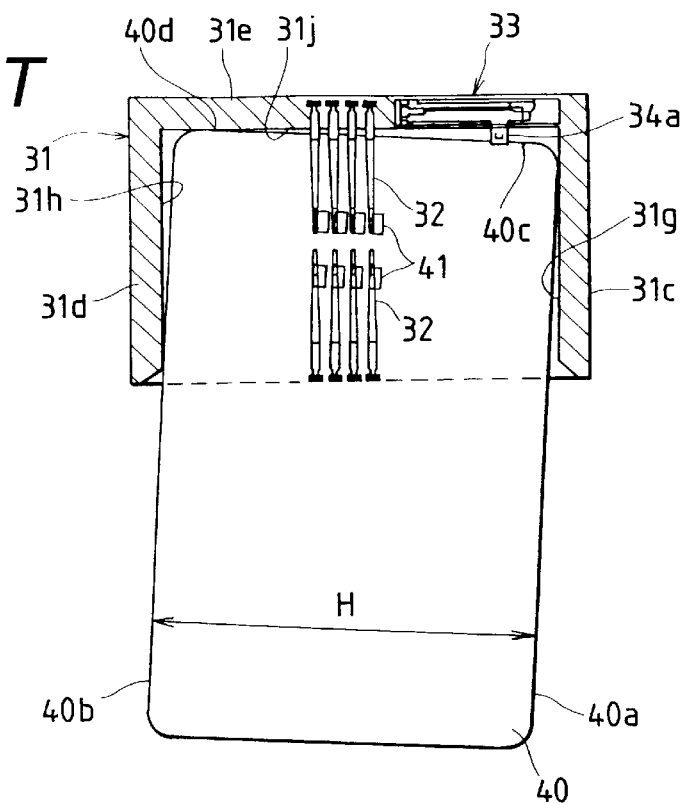
FIG. 19 is a plan view showing the conventional IC card connector, in which the IC card is inserted.
Figure 20:
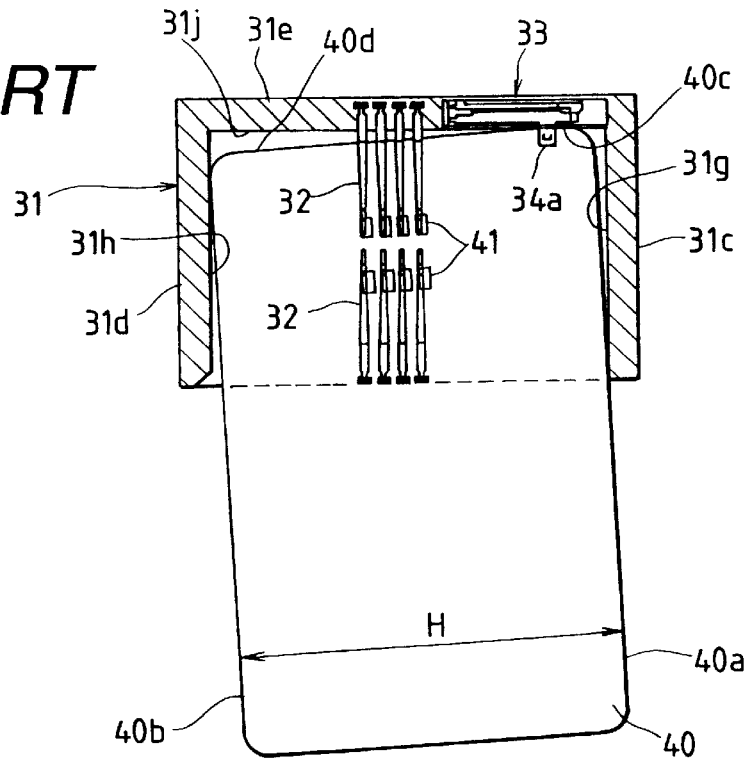
FIG. 20 is a plan view showing the conventional IC card connector, in which the IC card is inserted.

Further, FIG. 12 shows a third embodiment of the IC card connector of the present invention, in which the dent 1p comprising a slope of the first embodiment is replaced with a dent 1p comprising a recess part which increases the width of the deep part of the insertion slot 1f.

Note that the other elements of the third embodiment are the same as those of the first embodiment, therefore, the elements have the same reference numerals, and explanations of the elements will be omitted.

In the IC card connector of the present invention, the guide wall 1g of the side wall 1c positioned near the operation member 4a of the detection switch 3 has a vertical surface 1k provided in the orthogonal direction to the inner wall surface 1j of the rear wall 1e and a slope 1m connected to the vertical surface 1k, gradually increasing the space of the insertion slot 1f toward the front part of the insertion slot 1f. Further, the guide wall 1h of the side wall 1d has a vertical surface 1n provided in the orthogonal direction to the inner wall surface 1j of the rear wall 1e and a dent 1p increasing the space of the insertion slot 1f in the deep part of the insertion slot 1f.

By this arrangement, if the width H of the IC card 40 is small, the sides 40a and 40b of the IC card 40 are supported by the vertical surfaces 1k and 1n, thus the movement of the IC card 40 in the widthwise direction is regulated. Further, if the width H of the IC card 40 is large, the side 40a of the IC card 40 is supported by the slope 1m, thus the movement of the IC card 40 in the widthwise direction is regulated. Accordingly, the arrangement provides a highly-reliable IC card connector device which ensures operation of the operation member 4a of the detection switch 3 by the IC card 40, and ensures contact between the contacts 41 provided on the IC card 40 and the terminals 2.

Further, as the dent 1p provided on the guide wall 1h of the side wall 1d comprises a slope gradually increasing the space of the insertion slot 1f toward the deep part of the insertion slot 1f, if the width H of the IC card 40 is large, the IC card 40 is supported at the sides 40a and 40b by the slope 1m and the slope of the dent 1p, thus the movement of the IC card 40 in the widthwise direction is further regulated. Accordingly, the arrangement provides an IC card connector device which ensures operation of the operation member 4a of the detection switch 3 by the IC card 40, and ensures the contact between the contacts 41 provided on the IC card 40 and the terminals 2.

Further, as the interval Y1 between the vertical surface 1k and the vertical surface 1n is equal to the nominal width of the standard of the IC card 40, if the width H of the IC card 40 is small, the sides 40a and 40b of the IC card 40 are reliably supported by the vertical surfaces 1k and 1n, thus the movement of the IC card 40 in the widthwise direction is regulated. Accordingly, the arrangement provides an IC card connector device which ensures the operation of the operation member 4a of the detection switch 3 by the IC card 40, and ensures the contact between the contacts 41 provided on the IC card 40 and the terminals 2.

Further, as the interval Y1 between the vertical surface 1k and the vertical surface 1n is equal to the nominal width of the standard of the IC card 40, and the interval Y2 between the slope 1 and the slope of the dent 1p is slightly greater than the maximum width of the standard of the IC card 40, if the width H of the IC card 40 is small, the sides 40a and 40b of the IC card 40 are reliably supported by the vertical surfaces 1k and 1n. Further, if the width H of the IC card 40 is large, the sides 40a and 40b of the IC card 40 are reliably supported by the slope 1m and the slope of the dent 1p. Accordingly, the arrangement provides a highly-reliable IC card connector device which regulates the movement of the IC card 40 in the widthwise direction, and ensures the operation of the operation member 4a of the detection switch 3 by the IC card 40, further, ensures the connection between the contacts 41 provided on the IC card 40 and the terminals 2.

As many apparently widely different embodiments of the present invention can be made without departing from the spirit and scope thereof, it is to be understood that the invention is not limited to the specific embodiments thereof except as defined in the appended claims.

What is claimed is:

1. An IC card connector comprising:

a rear wall having an inner wall surface abuttable against a front end of an IC card;

first and second side walls, provided with an interval therebetween, extending in an orthogonal direction from said rear wall, having guide walls to support sides of said IC card;

a housing having an insertion slot for inserting said IC card, formed with said rear wall and said first and second side walls;

a detection switch provided at a rear portion of said housing, having an operation member operated by said IC card; and terminals attached to said housing and contactable with contacts provided on said IC card, wherein said operation member of said detection switch is provided around said first side wall, and said guide wall of said first side wall has a first vertical surface provided in an orthogonal direction to said inner wall surface of said rear wall in a deep part of said insertion slot, and a first slope connected to said first vertical surface, gradually increasing space of said insertion slot toward a front part of said insertion slot, and wherein said guide wall of said second side wall has a second vertical surface provided in the orthogonal direction to said inner wall surface of said rear wall at the front portion of said insertion slot, and a dent to increase the space of said insertion slot in the deep part of said insertion slot.

2. The IC card connector according to claim 1, wherein said dent provided on said guide wall of said second side wall comprises a second slope connected to said second vertical surface, gradually increasing the space of said insertion slot toward the deep part of said insertion slot.

3. The IC card connector according to claim 1, wherein the interval between said first vertical surface and said second vertical surface is equal to a nominal width of a standard of said IC card.

4. The IC card connector according to claim 2, wherein the interval between said first vertical surface and said second vertical surface is equal to a nominal width of a standard of said IC card, and wherein the interval between said first slope and said second slope is slightly greater than a maximum width of the standard of said IC card.

* * * * *

UNITED STATES PATENT AND TRADEMARK OFFICE
CERTIFICATE OF CORRECTION

PATENT NO. : 6,089,919  
DATED : July 18, 2000  
INVENTOR(S) : Toru Nishioka

Page 1 of 1

It is certified that error appears in the above-identified patent and that said Letters Patent is hereby corrected as shown below:

<u>Title page,</u>
<u>Column 1,</u>
Line 3, under "U.S. PATENT DOCUMENTS", insert the following:

-- FOREIGN PATENT DOCUMENTS

| | | |
|---|---|---|
| EP 0 414 390 A1 | 2/1991 | European Pat. Office |
| WO 91/04547 A2 | 4/1991 | PCT --. |

Signed and Sealed this

Thirteenth Day of November, 2001

*Attest:*

*Attesting Officer*

NICHOLAS P. GODICI
*Acting Director of the United States Patent and Trademark Office*